Aug. 27, 1935.  F. E. GLATT ET AL  2,012,714
VERTICAL SHAFT MOUNTING
Filed June 5, 1933   2 Sheets-Sheet 1
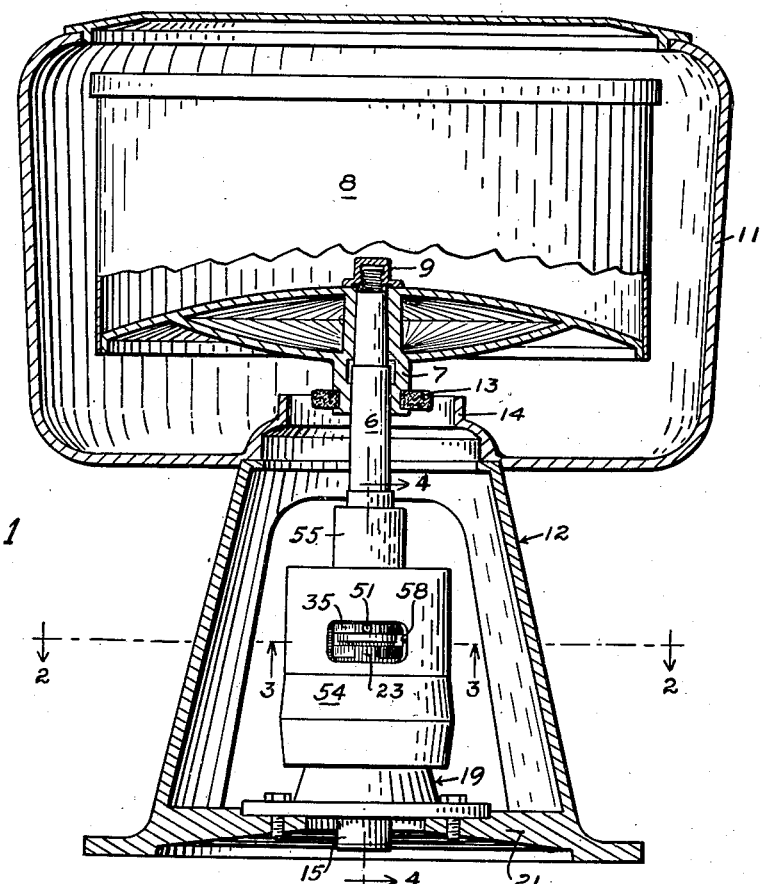
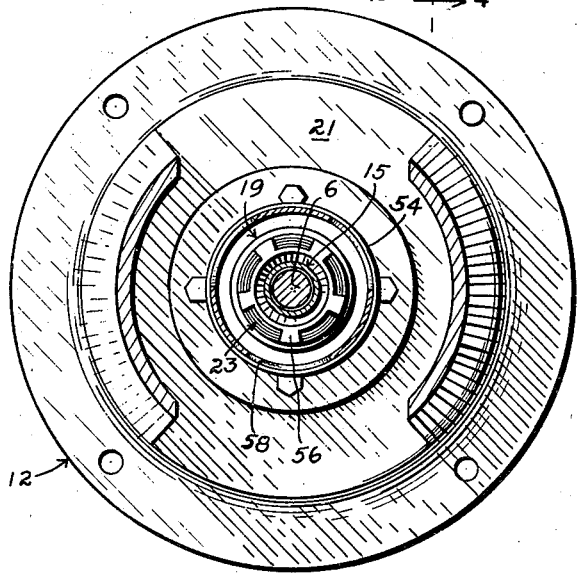
INVENTORS
FRED E. GLATT
AND GEORGE E. GLATT.
BY Henry N. Young
ATTORNEY.

Aug. 27, 1935.  F. E. GLATT ET AL  2,012,714
VERTICAL SHAFT MOUNTING
Filed June 5, 1933  2 Sheets-Sheet 2
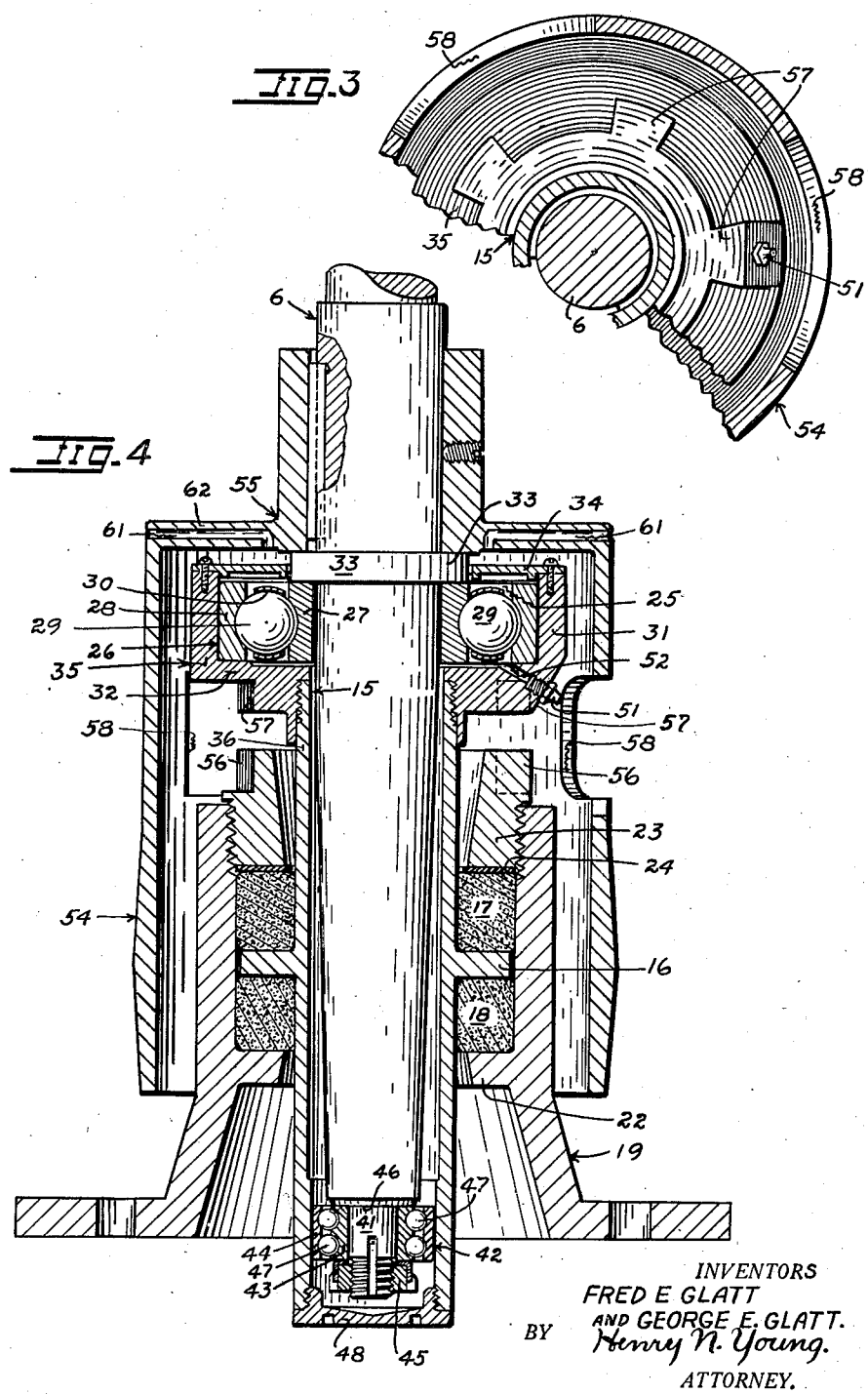
INVENTORS
FRED E GLATT
AND GEORGE E. GLATT.
BY Henry N. Young.
ATTORNEY.

Patented Aug. 27, 1935

2,012,714

UNITED STATES PATENT OFFICE 2,012,714

VERTICAL SHAFT MOUNTING

Fred E. Glatt and George E. Glatt, Oakland, Calif.

Application June 5, 1933, Serial No. 674,396

4 Claims. (Cl. 308—230)

The invention relates to a mounting means for the shaft of a centrifugal extractor or the like.

An object of the invention is to provide a particularly enduring supporting and bearing means for a vertical spindle or shaft carrying a relatively heavy load for rotation therewith.

Another object is to provide a particularly simple and effective means for lubricating the bearings of the mounting.

A more specific object is to provide a generally improved mounting for the shaft of a centrifugal liquid extractor wherein the shaft support and bearing means of the mounting is generally enclosed within a drive pulley on and for the shaft.

A further object is to provide for ready access to certain facilities of the mounting without dismantling the assembly.

Yet another object is to provide a cooling air draft for the support bearing of the shaft, said draft automatically produced as the shaft is rotated.

The invention possesses other objects and features of advantage, some of which, with the foregoing, will be set forth or be apparent in the following description of a preferred embodiment of the device, and in the accompanying drawings, in which, Figure 1 is a mainly sectional elevation through a centrifugal extractor having the features of present invention associated with the mounting for its shaft.

Figure 2 is a plan section at 2—2 in Figure 1.

Figure 3 is an enlarged and fragmentary section at 3—3 in Figure 1.

Figure 4 is an enlarged section of the shaft mounting taken at 4—4 in Figure 1.

As particularly illustrated, the features of present invention are provided in association with the mounting for the shaft 6 of a centrifugal extractor such as is adapted for use in laundry work. The upper end of the shaft 6 is tapered for centered engagement in the bore of a hub 7 at the bottom of a rotatable basket 8, and may be secured in said hub by means of a cap nut 9 threadedly engaging the upper shaft end. The basket 8 is enclosed in a tub 11 having a removable cover, and said tub is mounted on hollow supporting base 12 of frusto-conical outline. A depending portion of the basket hub 7 carries a bumper ring 13 of rubber or the like for engagement with a collar 14 provided at the bottom opening of the tub.

The lower portion of the shaft 6 is supported for rotation in a sleeve member 15, said sleeve provided at its exterior and intermediate of its length with a radial flange 16 and carrying rubber rings 17 and 18 at opposite sides of the flange. A tubular support member 19 is mounted in vertical disposition within the base 12 and on the bottom 21 of said base opposite a central opening in said base bottom. At some distance below its upper end, the support member 19 is provided with an inwardly directed flange or shelf 22 defining an opening coaxial with support bore portion thereabove and having a greater diameter than the sleeve 15. The rings 17 and 18 are arranged for fitted engagement within the bore of the support member 19 with the lower ring 18 engaging the shelf 22 whereby the sleeve 15 may be resiliently supported in and by the member 19 in normally coaxial relation to the latter.

A ring nut or gland 23 threadedly engages the top of the member for bearing on the upper ring 17 whereby the flange 16 may be non-rotatively clamped between the rings 17 and 18 with an adjusted degree of pressure. As shown, a bearing collar 24 is interposed between the nut 23 and the ring 17 for preventing damage to the latter as the nut is rotated for adjusting the pressure against the flange 16. The sleeve flange 16 is of slightly less diameter than the rings 17 and 18, and the openings of the nut 23 and collar 24 are larger than the sleeve 15 thereat whereby the sleeve is sustained solely by the rubber rings 17 and 18 and is permitted a certain degree of oscillation in its supported position. The described mounting arrangement for the bearing sleeve member is understood to provide for absorbing vibrations and resiliently resisting any tendency to shaft oscillation which may be caused by an off-center loading of the basket 8.

At its upper end, the sleeve member 15 is formed with a radially expanded portion to provide an annular chamber 25 for receiving an anti-friction ring bearing 26 comprising inner and outer race rings 27 and 28 having ball bearings 29 engaged between them whereby the rings are held against relative axial movement while relatively rotatable in their common plane. A cage 30 retains the bearings 29 spaced in their line. The outer race ring 28 snugly fits within the radially outer wall 31 of the chamber 25 and bears on the bottom wall 32 of said chamber, the latter wall being counterbored opposite the ring 27 whereby this ring is free of said wall.

It will now be noted that the shaft portion at the bearing 26 is arranged to slidably engage in the bore of the inner race ring 27 and that the shaft is provided with an annular flange or collar 33 immediately above said portion for engagement with the upper end of the ring 27 whereby the shaft is supported by said ring for free rotation in its place. An annular and removable plate 34 provides the upper wall of the chamber 25 as a closure for the latter opposite the shaft collar 33.

For permitting the installation of the ring 17 in its place on the sleeve member 15, the sleeve portion 35 which provides the chamber 25 for the bearing 26 is formed as a separate member for threaded mounting at the upper end of the other sleeve portion 36. In the present instance, the upper end of the sleeve portion 36 is externally threaded for engagement in an axial bore through the bottom wall 32 of the portion 35, said bore slightly longer than the shaft portion opposite it. As is particularly shown in Figure 4, the lower portion of the bore through the wall 33 is unthreaded and is arranged to snugly engage about an unthreaded part of the lower sleeve portion 36 whereby to insure a coaxial alignment of the sleeve portions when said portions are engaged in their unitary association.

At its lower end, the shaft 6 is provided with a reduced portion 41 which mounts an anti-friction ring bearing 42 comprising inner and outer race rings 43 and 44, the former of which closely fits the shaft portion 41 and is fixed thereto by means of a nut 45 threadedly engaging the extremity of said portion to clamp the ring 43 between it and a shoulder 46 at the upper end of the portion. Two lines of ball bearings 47 are engaged between the race rings 43 and 44, said ball bearings operative to secure the rings against relative axial movement thereof while permitting a relative rotation of the rings.

Opposite the ring 44, the bore of the sleeve 15 is slightly reduced and is finished to slidably receive the outer race ring 44. The diameter of the latter ring is preferably slightly less than that of the bore of the inner race ring 27 of the bearing 26 whereby the shaft may be removed upwardly through and from the sleeve without necessity of first removing the bearing 42 from the lower shaft end. A cap 48 threadedly engages the lower sleeve end for sealing the same.

The free space within the sleeve 15 and about the shaft portion below the shaft flange 33 is adapted to receive a lubricant, which lubricant may be, and is preferably, a grease. It will be understood that the effective use of a grease, or heavy-bodied, lubricant for the two ring bearing assemblies 26 and 42 which comprise the sole bearings for the shaft is made feasible in the present case because of the absence of any bearing bushings in the shaft mounting now described. While renewal of the grease lubricant in the space therefor need not be made very often, such renewal is arranged to be effected through a one-way inlet valve 51 which is mounted at the bottom of the upper sleeve portion 35 to receive the lubricant grease from a pressure hose (not shown) and to discharge the received lubricant through a duct 52 in said portion and terminating at the chamber 25 at a point thereof inwardly of the race ring 28.

The shaft 6, it will now be noted, mounts a tubular belt pulley 54 having its hub 55 at its upper end, said hub provided with a bore for closely receiving the shaft portion above the shaft flange 33, and said shaft and pulley hub being mutually keyed, or otherwise secured for rotation together. The pulley, it is noted, generally encloses the shaft mounting previously described, and its crown portion for engagement by a driving belt (not shown) is preferably provided in the plane of the support flange 16 of the sleeve 15, which sleeve is understood to provide a housing for the described bearings and may be referred to as a bearing housing as occasion may require. Opposite sides of the base 12 are left open as is shown, whereby to provide for the extension of a belt to and around the pulley and to provide for access to the pulley and shaft mounting of the extractor assembly.

Lugs 56 extend axially from the upper end of the nut 23 for use in adjusting the setting of the same by use of a spanner wrench, or the like. For facilitating the securing of the sleeve portions 35 and 36 in unitary association, lugs 57 are provided on the sleeve portion 35 to extend axially downwardly from the bottom thereof, the latter lugs also adapted for engagement by a suitable wrench. As particularly shown, the grease inlet valve 51 is mounted in a lug 57 of the sleeve 15 and the duct 52 traverses said lug in oblique relation to the shaft axis.

Since the lugs 56 and 57 and the valve 51 are substantially coplanar, the pulley 54 may be perforated opposite said lugs and valve for permitting access thereto without necessity of dismounting the pulley. Accordingly, and as shown, three mutually aligned circumferential slots 58 are provided in the pulley, said slots of a size to permit an operative insertion of a wrench therethrough for application to the lugs 56 or 57, or the application of a grease supply hose to the valve 51. Besides providing access to the lugs 56 and 57 and the valve 51, the slots 58 are also understood to provide for a cooling circulation of air about the described mounting, and particularly at the lower part of the sleeve portion 35, whereby the temperature of the parts may be maintained at a value approximating that of the surrounding air.

For further insuring a cooling of the upper sleeve portion 35, radial ducts 61 are shown provided in the end pulley wall 62 at the pulley hub 55, said ducts leading from the inner side of said wall. As the pulley is rotated, centrifugal force will effect an air discharge radially through and from the ducts 61 whereby to induce an upward air flow within the pulley portion opposite the sleeve portion 35. The resulting air circulation is arranged to minimize the temperature at said shaft-supporting point of the sleeve assembly, it being clear however that the relatively large grease-lubricated ring bearing provided thereat would not be expected to generate much heat as long as it is properly lubricated.

From the foregoing description taken in connection with the accompanying drawings, the advantages of the construction and method of operation will be readily understood by those skilled in the art to which the invention appertains, and while we have described the principle of operation, together with a device which we now consider to be a preferred embodiment thereof, we desire to have it understood that the device shown is merely illustrative, and that such changes may be made, when desired, as fall within the scope of the appended claims.

Having thus described our invention, we claim as new and desire to secure by Letters Patent of the United States the following:

1. In a mounting for the load-supporting vertical shaft of a centrifugal machine or the like, an upright sleeve freely receiving a lower portion of said shaft, an anti-friction ring bearing mounted at the upper sleeve end and operative to fully support said shaft from the sleeve and for free rotation, an anti-friction ring bearing coactive between a lower shaft portion in the sleeve and the sleeve bore laterally thereof and solely operative for centering the shaft in the sleeve portion thereat, and means resiliently supporting said sleeve for a limited swinging oscillation thereof about a point intermediate said shaft bearings.

2. In a mounting for the load-supporting upright shaft of a centrifugal machine, an upright sleeve coaxially receiving the lower portion of said shaft in spaced relation therefrom and radially expanded at its upper end to provide an annular space about the shaft thereat, a rolling bearing mounted in said space and comprising race rings engaging a single line of rolling elements between them and respectively engaging the shaft and sleeve to wholly support the shaft on the sleeve while centering the shaft in the sleeve, a rolling bearing mounted within the lower sleeve end and cooperative between the sleeve and shaft to center the shaft with respect to the sleeve thereat, means resiliently engaging said sleeve at a plane intersecting the same at a point between the planes of operation of the different said rolling bearings, and a belt pulley enclosing said sleeve at and above the plane of support of the sleeve and having the hub thereof fixed to said shaft above the sleeve.

3. In a mounting for the load-supporting upright shaft of a centrifugal machine, an upright sleeve coaxially receiving the lower portion of said shaft in spaced relation therefrom, a rolling bearing mounted within the upper sleeve end and cooperative between the sleeve and shaft to center said shaft in the sleeve thereat while wholly supporting the shaft from the sleeve, a rolling bearing mounted within the lower sleeve end and cooperative between the sleeve and shaft to center said shaft with respect to the sleeve portion thereat, means resiliently engaging said sleeve at a plane intermediate the planes of the said rolling bearings, a belt pulley enclosing said sleeve at and above said plane of the sleeve and having the hub thereof fixed to said shaft above the sleeve, and means of the pulley operative by and upon a rotation of the pulley to induce an upward flow of air within the pulley and both axially and radially about the upper said rolling bearing for cooling the same.

4. A structure in accordance with claim 2 wherein the air circulating means comprises a radial air duct in the hub end of the pulley and extending outwardly from a point within the pulley and adjacent the shaft whereby the air circulation is centrifugally induced when the pulley is rotated.

FRED E. GLATT.
GEORGE E. GLATT.